United States Patent [19]
Fries et al.

[11] Patent Number: 4,660,466
[45] Date of Patent: Apr. 28, 1987

[54] ESPRESSO COFFEE MACHINE

[75] Inventors: Robert Fries, Wülfrath; Kurt Michels, Düsseldorf, both of Fed. Rep. of Germany

[73] Assignee: Poccino-Expresso Import- und Export GmbH, Dusseldorf, Fed. Rep. of Germany

[21] Appl. No.: 725,320

[22] Filed: Apr. 19, 1985

[30] Foreign Application Priority Data

Apr. 21, 1984 [DE] Fed. Rep. of Germany ....... 3415204

[51] Int. Cl.$^4$ ............................................. A47J 31/30
[52] U.S. Cl. ...................................... 99/294; 99/295; 99/302 R
[58] Field of Search ...................... 99/293, 294, 301 R, 99/295, 300, 179, 288; 426/433

[56] References Cited
U.S. PATENT DOCUMENTS

| | | | |
|---|---|---|---|
| 992,021 | 5/1911 | Marzetti | 99/302 R |
| 1,493,984 | 5/1924 | Iglesias | 99/294 |
| 2,549,132 | 4/1951 | Robbiati | 99/302 R |
| 4,287,817 | 9/1981 | Moskowitz | 99/293 |

FOREIGN PATENT DOCUMENTS 1270180  7/1961  France .............................. 99/302 R Primary Examiner—Robert W. Jenkins
Attorney, Agent, or Firm—Karl F. Ross; Herbert Dubno

[57] ABSTRACT

The invention provides an espresso coffee machine comprising an electrically heated vessel with a removable tight-closing lid intended for receiving water, and a rising pipe one end of which opens out in the vicinity of the bottom of the vessel while the other end leads to a container arranged at a distance above the vessel intended for receiving ground coffee. Arranged on the lid is a pipe leading outside the vessel and connecting to the vessel interior via a valve which can be actuated outside the vessel. The lid pipe permits entry of dry steam into the machine to, for example, foam milk.

3 Claims, 2 Drawing Figures

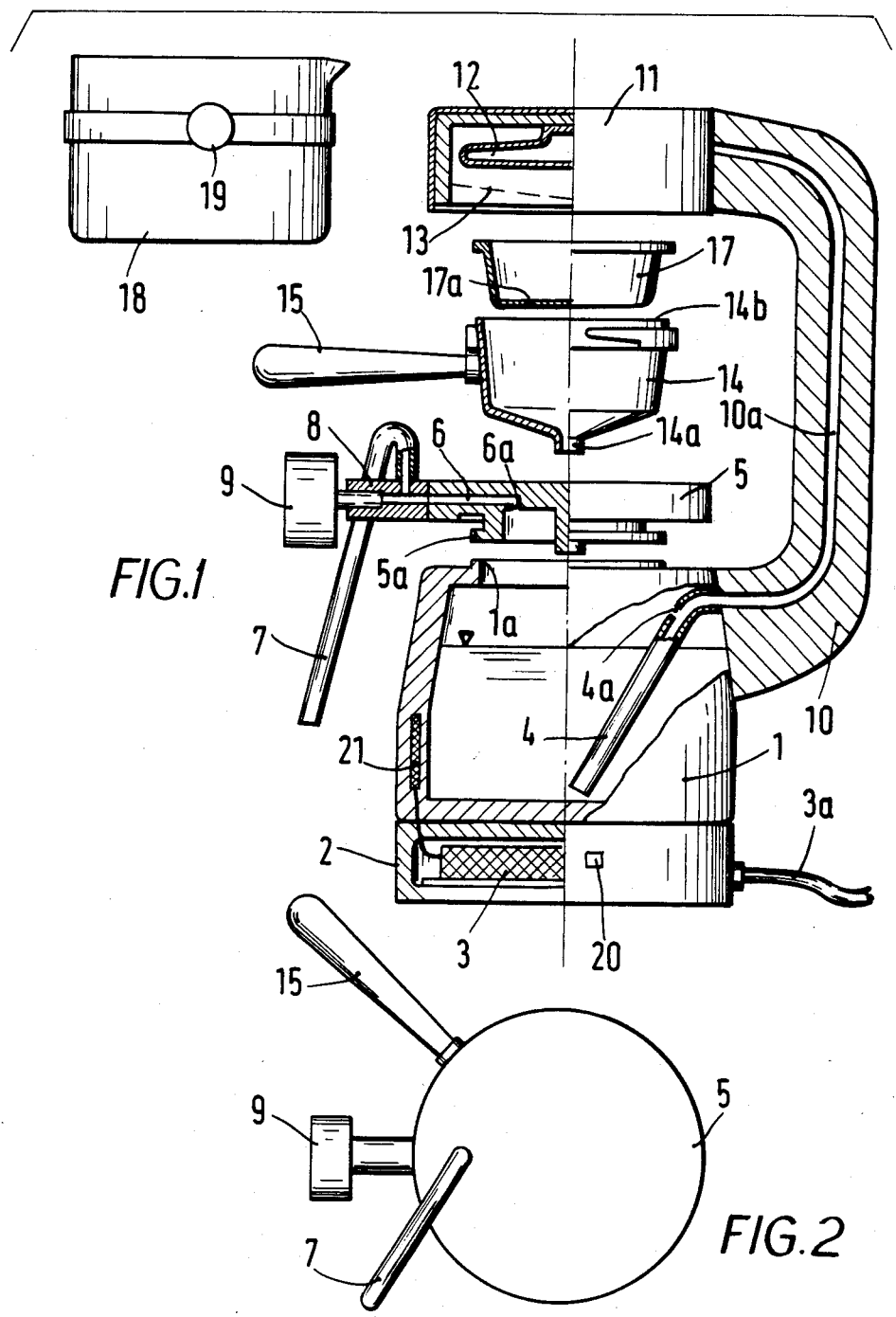

4,660,466

ESPRESSO COFFEE MACHINE

BACKGROUND OF THE INVENTION

The invention relates to an espresso coffee machine with an electrically heatable vessel having a removable tight-closing lid and intended for receiving water, and with a rising pipe, one end of which opens out in the vicinity of the bottom of the vessel and the other end of which leads to a container which is arranged at a distance above the vessel and is intended for receiving ground coffee and the water flow of which is controlled as a function of a specific steam pressure.

A coffee machine of this type is the subject of German patent application No. P 28 33 351.9.

The invention is based on the new idea of designing such an espresso coffee machine in such a way that, during the time when the espresso coffee is produced, it supplies dry steam which can be used, for example, to foam up milk.

According to the invention, this object is achieved because there is arranged on the lid a pipe which leads outside the vessel and which is connected to the interior of the vessel via a valve which can be actuated outside the vessel.

Such a machine can therefore produce at the same time espresso coffee by means of water at a temperature of approximately 92° to 96° C. and a steam which can be used outside the vessels of the machine and the temperature of which is above the boiling temperature of water, for example between 105° and 120° C.

BRIEF DESCRIPTION OF THE DRAWING

The drawing illustrates an exemplary embodiment of the invention.

FIG. 1 shows an exemplary embodiment of the invention partly in vertical section and partly in a side view, the parts of the machine which can be lifted off from one another being shown in the lifted off position, FIG. 2 shows a plan view of the lid of the machine.

SPECIFIC DESCRIPTION

The espresso coffee machine illustrated has a vessel 1 which has to be filled with water up to a certain limit. The vessel 1 resets firmly on a base 2 containing an electrical heating element 3 which is connected to an electrical lead 3a leading outwards. The vessel 1 can be sealed off by a lid 5 by means of a sealing ring 5a which comes up against a projecting edge 1a of the vessel 1. The lid 5 has a bayonet fastening 5b, by means of which the lid 5 placed on the vessel 1 can be tightened in the axial direction against the vessel 1 as a result of the rotation of the lid 5 about its axis by means of a handle 15. In the lid 5 there is a bore 6 which opens 6a into the interior of the vessel 1 in such a way that it cannot be reached by water which, for example, splashes up out of the vessel 1. At its other end, the bore 6 opens into the end of a small pipe 7, the other end of which opens into a region outside the vessel 1. By means of a valve 8 which can be rotated by means of a handle 9, the mouth of the small pipe 7 opening into the bore 6 can be closed and opened to a greater or lesser extent.

The vessel 1 contains a pipe 4, the bottom end of which extends into the vicinity of the bottom of the vessel 1 and the other end of which opens into a bore 10a of a handle 10 fastened to the top end of the vessel 1. The carrying arm 10 carries at its top end a cylindrical body 11 which is open at the bottom and which carries a liquid dispenser 12 which is fastened to the upper wall of the latter and into which the bore 10a opens. The underside of the dispenser 12 has a plurality of bores 12a. Underneath it, a sieve 13 sits in the body 11.

A container 14 can be connected in a leak-proof manner to the underside of the body 11 by means of a bayonet fastening 14b. The container 14 has a handle 16, by means of which it can be rotated about its axis and the bayonet fastening 14b consequently tightened against the body 11. The container 14 is funnel-shaped at the bottom and is provided with an outflow orifice 14a. A sieve 17, the bottom 16a of which is designed as a fine sieve, can be inserted into the container 14.

The pipe has an orifice 4a opening into the uppermost part of the interior of the vessel 1. The orifice 4a is such that it ensures that the water is conveyed through the rising pipe 10a as a function of the steam pressure in the vessel 1, in such a way that the temperature of the water flowing into the sieve 17 is around 93° to 96° C., whilst the temperature of water located in the vessel 1 is above 100° C.

In the base 2 there is a signal lamp 20 which lights up when the heating element 3 is switched on and which is extinguished as soon as a thermostat 21 located in the jacket of the vessel 1 switches off the heating element 3, when the temperature of the water in the vessel 1 exceeds the boiling temperature by a predetermined amount.

The machine is operated when the vessel 1 is filled with water up to a limit located below the orifice 4a and the sieve 17 is filled with ground coffee. By means of the handles 15 and 16, the lid 5 is connected in a leak-proof manner to the vessel 1 and the container 14 is connected in a leak-proof manner to the body 11. A container for receiving the espresso coffee to be produced is placed on the lid 5, this being, for example, a coffee cup or a vessel 18 provided with a handle 19, the shape of which can match the shapes of the handles 15 and 16.

We claim:

1. An espresso coffee machine with an electrically heatable vessel having a removable tight-closing lid and intended for receiving water, and with a rising pipe, one end of which opens out in the vicinity of the bottom of the vessel and the other end of which leads to a container which is arranged at a distance directly above the vessel and is intended for receiving ground coffee and the water flow of which is controlled as a function of a specific steam pressure, wherein there is arranged on the lid a pipe which leads outside the vessel and which is connected to the interior of the vessel via a valve which can be actuated outside the vessel, and a space provided vertically above the lid but beneath the ground coffee container capable of accommodating a finished-coffee receiving vessel, the rising pipe having or forming a cooling device outside the vessel and the pipe being unconnected to the lid.

2. An espresso coffee machine as claimed in claim 1, wherein, to form the cooling device, the rising pipe is surrounded outside the water vessel by more material, especially metal, than is required for the pipe wall.

3. An espresso coffee machine as claimed in claim 1 wherein, to form the cooling device, the rising pipe has outside the water vessel a greater length than the shortest length required.

* * * * *